United States Patent [19]
McGrevy

[11] Patent Number: 5,478,230
[45] Date of Patent: Dec. 26, 1995

[54] BACK-TO-BACK VALVE GATE SYSTEM

[75] Inventor: Alan N. McGrevy, Chino, Calif.

[73] Assignee: Caco Pacific Corporation, Covina, Calif.

[21] Appl. No.: 227,016

[22] Filed: Apr. 13, 1994

[51] Int. Cl.$^6$ ................................................ B29C 45/23
[52] U.S. Cl. .................... 425/504; 261/328.15; 425/566; 425/570
[58] Field of Search ..................................... 425/562, 563, 425/564, 565, 566, 570; 264/328.15

[56] References Cited

U.S. PATENT DOCUMENTS

| 4,043,726 | 8/1977 | Tsunemoto et al. | 425/563 |
| 4,588,367 | 5/1986 | Schad | 425/549 |
| 5,013,235 | 5/1991 | Friderich | 425/564 |

FOREIGN PATENT DOCUMENTS

| 0374353 | 6/1990 | European Pat. Off. |
| 2443329 | 12/1979 | France |

OTHER PUBLICATIONS

PE Plast Europe, No. 1, Mar. 1992, Munich DE, pp. 58–60, Hubrich & Nachtsheim "Stack Moulds Save Costs".

Primary Examiner—Tim Heitbrink
Attorney, Agent, or Firm—Ellsworth R. Roston; Charles H. Schwartz

[57] ABSTRACT

A manifold is disposed within a pair of abutting pre-load mold plates in a pre-load relationship. Fluid flowing through the manifold is heated by a first heater. The fluid is then divided into a plurality of passages in the manifold. Pairs of passages have a back-to-back in-line relationship. A cylinder between each pair of the in-line passages holds a pair of pistons in the in-line relationship. Each piston in the pair has piston units in an interdigitated relationship with piston units on the other piston in the pair. Each pair of pistons is movable by pressurized fluid (e.g. air) between first and second positions. In the first position, each piston provides for the fluid (e.g. resin melt) flow through one of the passages to a pair of runners in the manifold. In the second position, each piston prevents the resin melt flow through the passages. A first heater heats the resin melt flowing through the passages. A second heater heats the resin melt flowing through the runners. Resin melt is prevented from leaking between the manifold and the mold plates even with temperature changes in the manifold as a result of the heating of the resin melt. This is accomplished by a pair of tongues, one rigid and the other resilient, extending from the manifold to the mold plate. In this way, fluid flowing into the manifold through one inlet exits through a plurality (e.g. 8) of gates without leakage after being heated at the passages and at the runners.

57 Claims, 6 Drawing Sheets

BACK-TO-BACK VALVE GATE SYSTEM

This invention relates to apparatus for heating fluid (e.g. resin melt) and for injecting the fluid into molds for the formation of articles having a configuration corresponding to that of the molds. More particularly, the invention relates to apparatus for receiving the fluid through a single inlet and for injecting the fluid simultaneously into a plurality of cavities within a mold through a plurality of gates. The invention is especially related to apparatus for disposing pairs of the gates, and pistons for controlling the flow of the fluid to the gates, in a back-to-back in-line relationship.

BACKGROUND OF INVENTION

Fluids such as plastic material are molded into different configurations. The fluid is passed through apparatus for heating the fluid and for injecting the fluid into the molds. When the fluid solidifies, it forms an article with a shape corresponding to the shape of the molds. It is important that the fluid is heated before it is injected into the molds to insure that the fluid will flow easily into the molds and completely fill the molds before it solidifies.

The injection apparatuses now in use produce articles of like configuration by the thousands. Because of this, it is important to mold the articles as quickly as possible. It would accordingly be desirable to inject fluid into a plurality of cavities simultaneously from a single heating and injecting apparatus. It would additionally be desirable to provide pairs of gates, and the pistons for controlling the fluid to the gates, in a back-to-back in-line relationship in such apparatus to double the number of cavities while maintaining the cavities compact. In such an arrangement, fluid (e.g. resin melt) would flow through one of the passages in one direction in the in-line relationship and fluid would flow through the other passage in the opposite direction in the in-line relationship. The fluid flowing through the passages would then flow through gates in the apparatus to individual cavities within a mold.

To minimize the size of the fluid-injecting apparatus and to increase the number of cavities simultaneously receiving fluid (e.g. resin melt) in a mold from a single injecting apparatus, it would even be desirable to provide for the introduction of fluid through a single inlet and to provide for the flow of fluid simultaneously through a multiple number of passage and then to a multiple number of gates. In such apparatus, it would be desirable to pair the passages, and the pistons for controlling the flow of fluid through the passages to the gates, in a back-to-back in-line relationship.

The desirability of having a multiple number of passages and the associated pistons in a paired back-to-back in-line relationship has been known for some time. However, no one has been able to provide apparatus which provides such a relationship of the passages and the associated pistons satisfactorily in an in-line relationship. The problem of providing such apparatus has been further compounded as a result of the difficulty of providing such apparatus without having fluid leak from the apparatus when the apparatus becomes heated by heaters in the apparatus for heating the fluid.

BRIEF DESCRIPTION OF INVENTION

In one embodiment of the invention, a manifold is disposed within a pair of abutting pre-load mold plates in a pre-load relationship. Fluid flowing through the manifold is heated by a first heater. The fluid is then divided into a plurality of passages in the manifold. Pairs of passages have a back-to-back in-line relationship. A cylinder between each pair of the in-line passages holds a pair of pistons in the in-line relationship.

Each piston in the pair has piston units in an interdigitated relationship with piston units on the other piston in the pair. Each pair of pistons is movable by pressurized fluid (e.g. gas such as air under pressure) between first and second positions. In the first position, each piston provides for the fluid (e.g. resin melt) flow through one of the passages to a pair of runners in the manifold. In the second position, each piston prevents the fluid flow through the passages. A first heater heats the fluid (e.g. resin melt) flowing through the passages. A second heater heats the fluid flowing through the runners.

Fluid (e.g. resin melt) is prevented from leaking between the manifold and the mold plates even with temperature changes in the manifold as a result of the heating of the fluid. This is accomplished by a pair of tongues, one rigid and the other resilient, extending from the manifold to the mold plate. In this way, fluid flowing into the manifold through one inlet exits through a plurality (e.g. 8) of gates without leaking after being heated at the passages and at the gates.

DETAILED DESCRIPTION OF INVENTION

Figure 2:
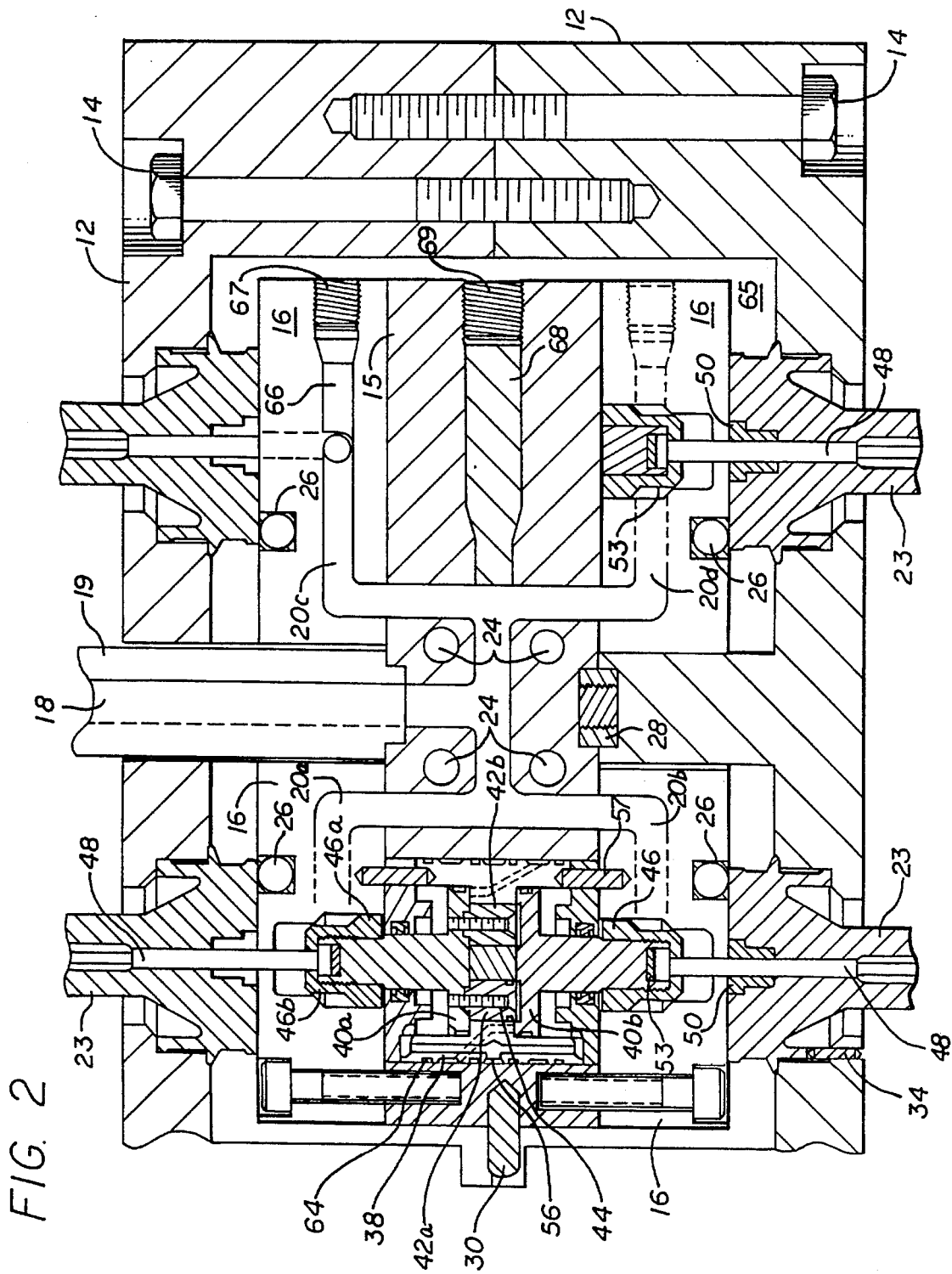
FIG. 2 is a front elevational view, partially in section, of the apparatus shown in FIG. 1.

An embodiment of an apparatus constituting one embodiment of this invention is generally shown at 10. The embodiment includes mold plates 12 (FIG. 2) joined as by bolts 14. A main manifold 15 (FIG. 2) and sub manifolds 16 are disposed within the mold plates 12. The main manifold 15 and sub manifolds 16 are pre-loaded within the mold plates 12 to abut the mold plates and one another in a tightly pressed relationship. The mold plates 12, the main manifold 15 and the sub manifolds 16 may be considered as a housing.

Figure 3:
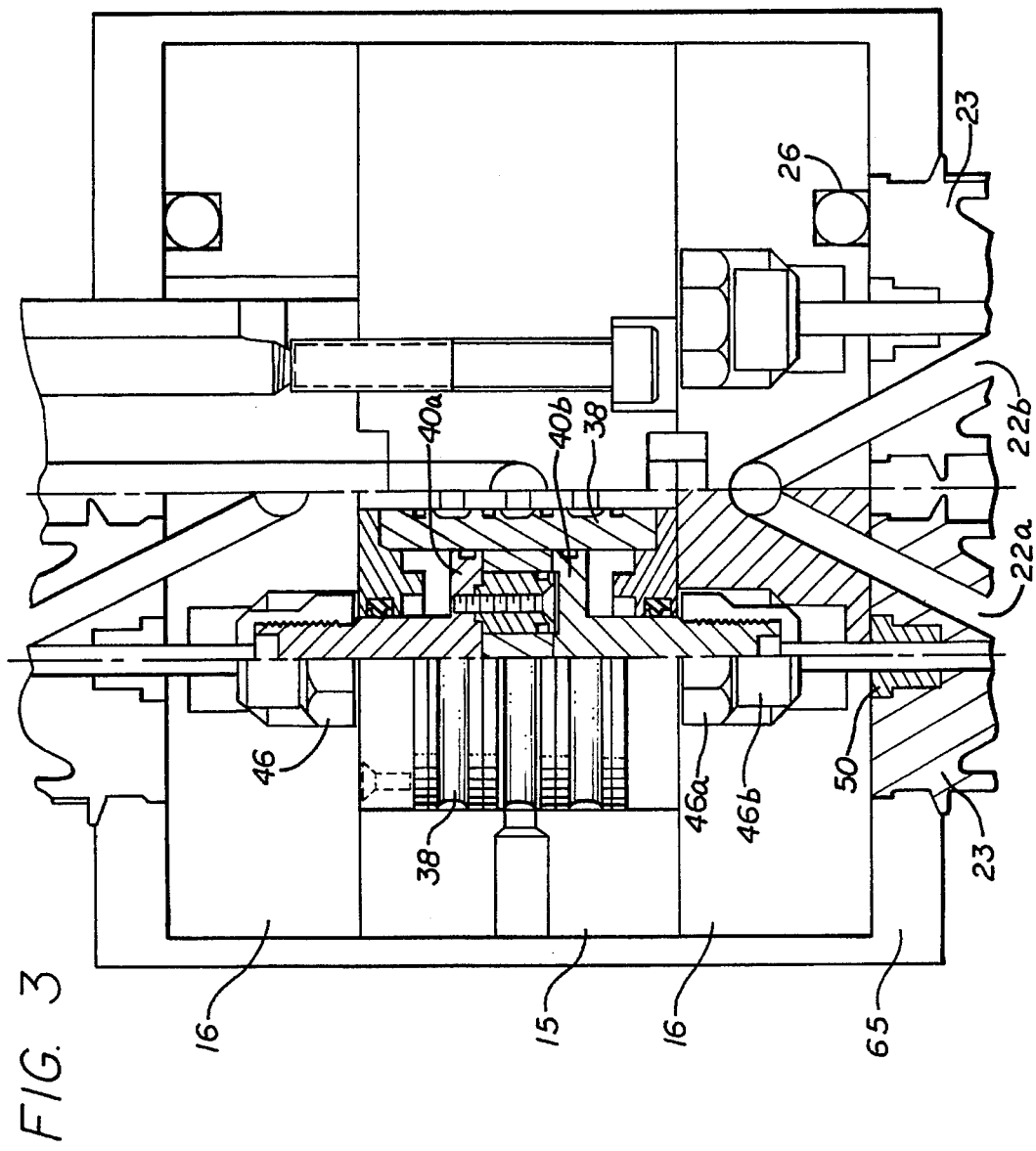
FIG. 3 is a fragmentary side elevational view, partially in section, of the apparatus shown in FIGS. 1 and 2.

An inlet 18 is disposed within a sprue bar 19 in one of the sub manifolds 16 and the main manifold 15 to receive fluid from a source (not shown). The fluid is then transferred from the inlet 18 to a plurality of passages 20a, 20b, 20c and 20d. The fluid is then transferred from each of the passages 20a, 20b, 20c and 20d to another pair of passages. For example, the fluid in the passage 20b is transferred to another pair of passages 22a and 22b (FIG. 3). Each of the passages such as the passages 22a and 22b is disposed in an injection nozzle such as an injection nozzle 23. In this way, the fluid passing through the single inlet 18 is transferred into a plurality (e.g. 8) of passages such as the passages 22a and 22b. The number of passages in the plurality may be any desired number and may be considerably greater than eight (8). The fluid flowing from the passages such as the passages 22a and 22b may be injected into hollow cavities in the mold (not shown). Each of the cavities has an individual shape to produce articles of that shape.

Figure 1:
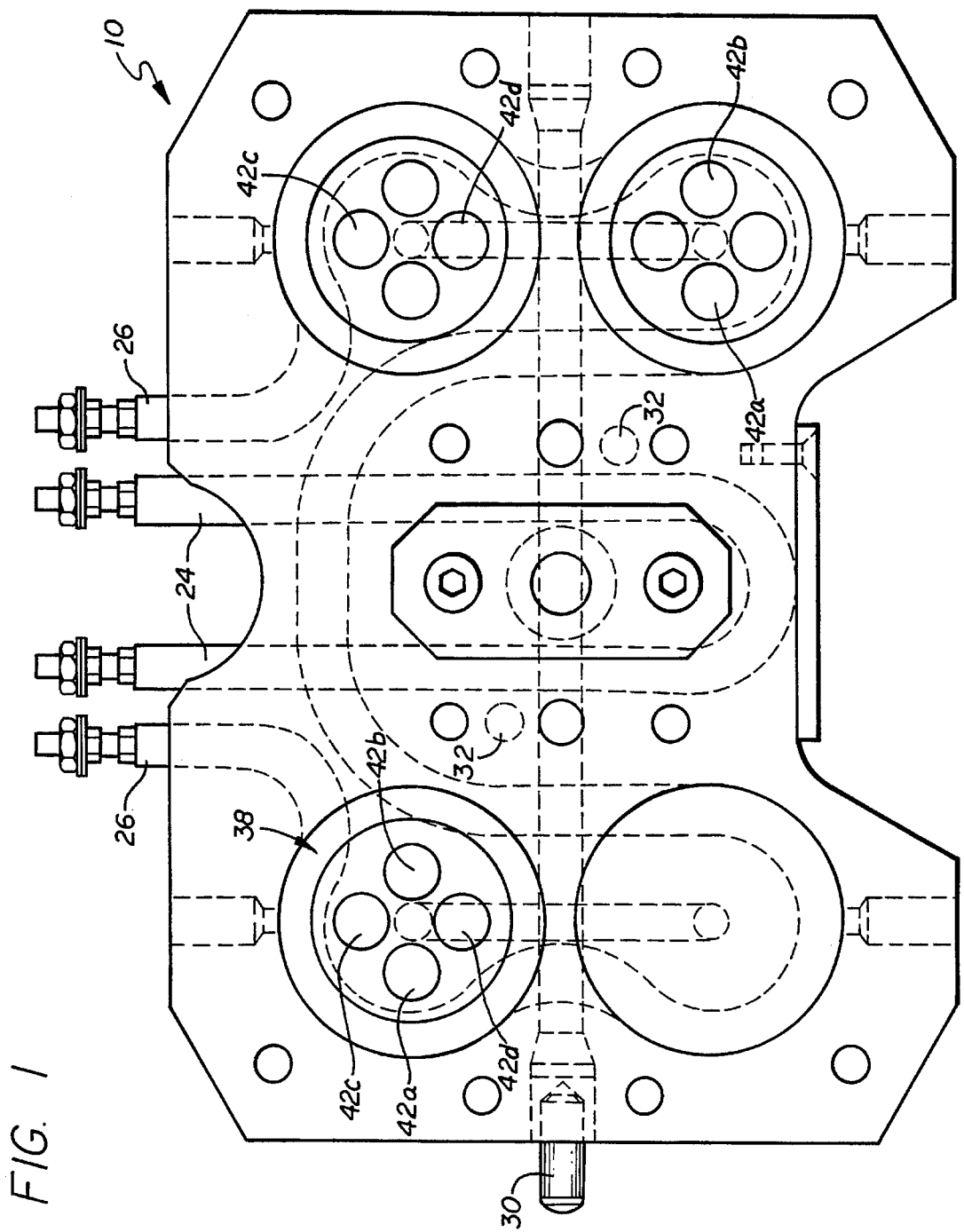
FIG. 1 is a top view of apparatus constituting one embodiment of the invention.

Heaters 24 (FIGS. 1 and 2) are disposed to heat the fluid (e.g. resin melt) in the passages 20a, 20b, 20c and 20d. Heaters 26 are disposed to heat the fluid in the passages such as the passages 22a and 22b. The heaters 26 may be disposed in an assembly to facilitate removal of the heaters from the assembly when the heaters become worn or defective. Such a heater assembly is disclosed and claimed in application Ser. No. 08/186,281 filed by Alan McGrevey on Jan. 24, 1994, and entitled "Heater for Injection Molding" and assigned of record to the assignee of record of this application. The heaters 24 may produce a temperature the same as, or different from, the heaters 26.

A number of members may be included to position the main manifold 15 and the sub manifold 16 properly relative to each other and to the mold plate 12. For example, a ring 28 (FIG. 2) made from a suitable material such as steel may be provided as a center locator and pressure ring between the mold plate 12 and the main manifold 15. Dowel pins 30 (FIG. 1) may be provided for locating the main manifold 15 relative to the mold plates 12 and for preventing swivelling of the main manifold relative to the mold plates. Dowels 32 (FIG. 1) may be provided to locate the sub manifold 16 relative to the main manifold 15. The dowels 32 prevent the sub manifold 16 from swivelling with respect to the main manifold 15 and assure that the passages 20a, 20b, 20c and 20d in the main manifold and the sub manifolds will be properly aligned. Dowels 34 (FIG. 2) locate the outlets such as the outlets 22a and 22b properly.

Cylinder bodies 38 (FIG. 2) are disposed in the main manifold 15. The cylinder bodies 38 are hollow to define a chamber for receiving pistons 40 for movement in such chamber. For example, pistons 40a and 40b are movable in the chamber in the cylinder body 38 shown in FIG. 1. A pair of piston units are attached as by screws 44 to each of the pistons 40 and 40b. For example, piston units 42a and 42b (FIGS. 1 and 2) are attached to the piston 40a and a pair of piston units 42c and 42d (FIG. 1) are attached to the piston 40b.

The piston units 42a and 42b are diametrically opposite each other as are the piston units 42c and 42d. However, the piston units 42a and 42b are angularly displaced by 90° from the piston units 42c and 42d. In this way, the piston units 42a and 42b are disposed in an interdigitated or nesting relationship with the piston units 42c and 42d. This causes a compact relationship to be established between the piston units 40a and 40b and the piston units 42c and 42d. Furthermore, this nested or interdigitated relationship prevents the pistons 40a and 40b from rotating relative to each other. This provides for the movement of the pistons 40a and 40b only in a back-to-back in-line relationship.

Figure 8:
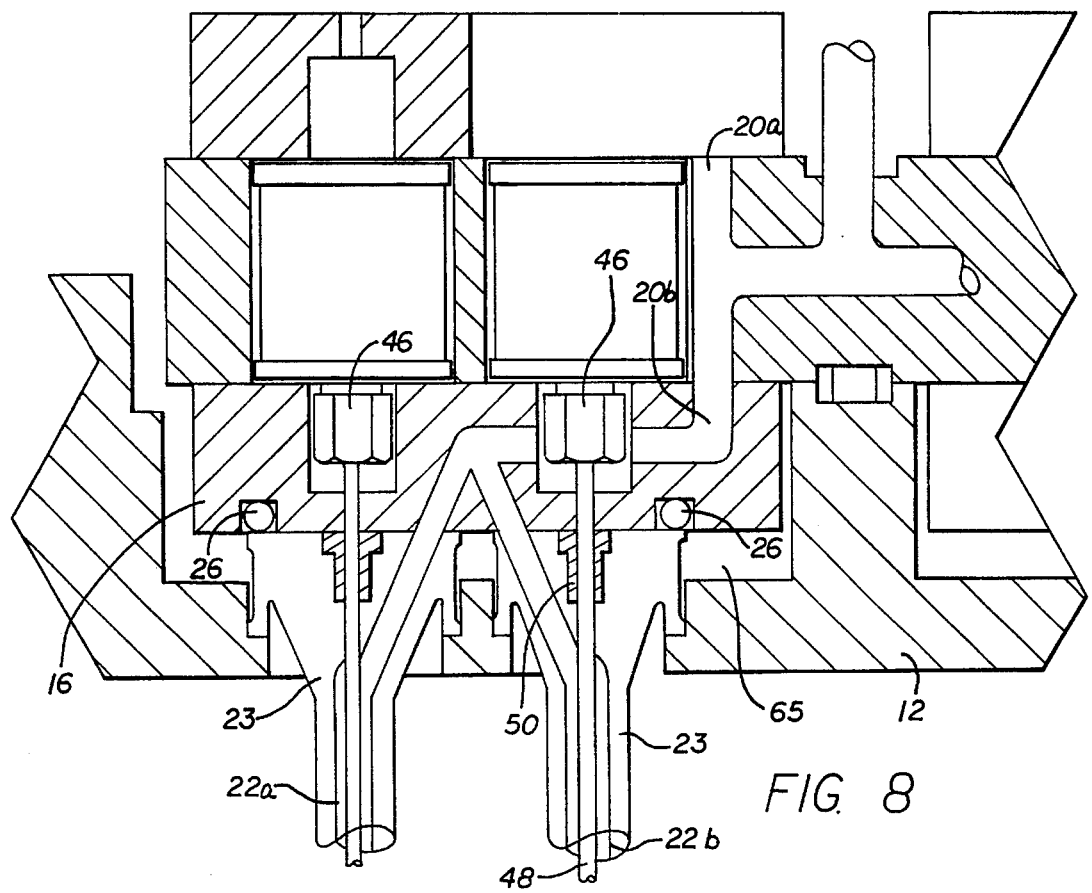
FIG. 8 is an enlarged fragmentary side elevational view similar to that shown in FIG. 3 and illustrates in additional detail the passage of the fluid through the apparatus constituting this invention.

The pistons such as the pistons 40a and 40b are provided with captive nuts such as a captive nut 46 (FIG. 2) which screws on the piston. The captive nuts such as the captive nut 46 have a first portion (e.g. 46a for the piston 40a) of large diameter and have a second portion (e.g. 46b for the piston 40a) of reduced diameter. Valve pins such as a valve pin 48 (FIGS. 2 and 8) extend through centrally disposed holes in the captive nuts such as the captive nut 46. The valve pins such as the valve pin 48 are movable with the associated piston such as the piston 40b.

Figure 4:
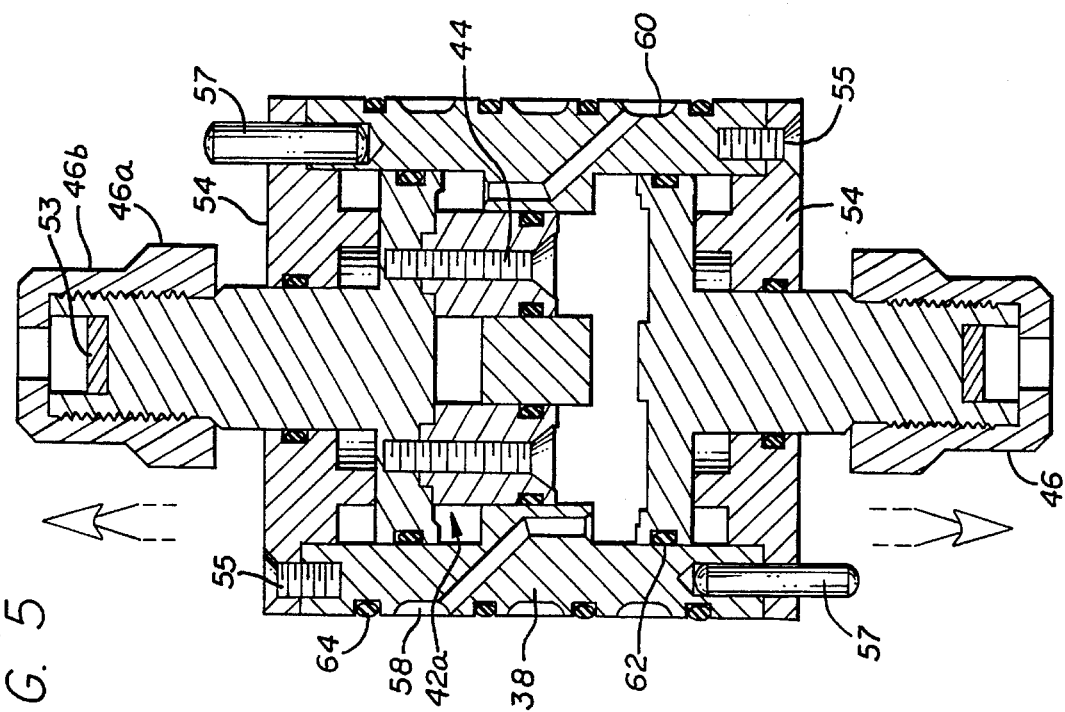
FIG. 4 is an enlarged fragmentary sectional view similar to that shown in FIG. 2 and shows a pair of back-to-back in-line pistons in an open relationship for passing fluid to associated gates and additionally shows channels for receiving fluid such as air under pressure for moving the pistons to close the gates.
Figure 5:
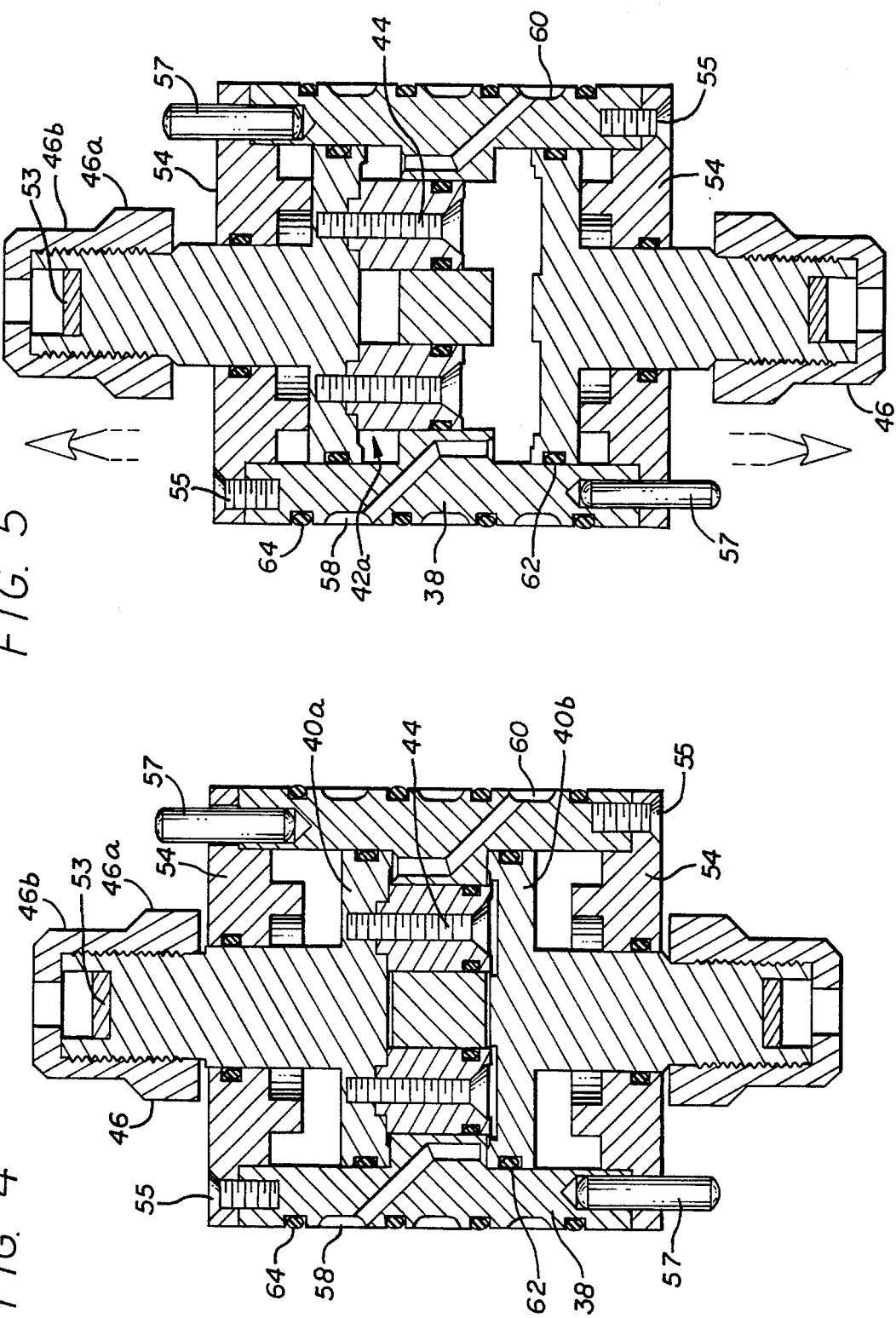
FIG. 5 is an enlarged fragmentary view similar to that shown in FIG. 4 and shows the pair of back-to-back in-line pistons in a closed relationship for preventing fluid from passing to the associated gates and also shows the channels for receiving the fluid such as the air under pressure for moving the pistons to close the gates.

The pistons such as the piston 40 and the valve pins such as the valve pin 48 have two positions. In one position, the pistons such as the piston 40 close the gates at the end of the passages 22a and 22b against the passage of fluid (e.g. resin melt) to the mold cavities. This occurs when the portion 46a of the enlarged diameter in the captive nut 46 closes the associated one of the passages such as the passages 22a and 22b. The closed position is shown in FIG. 5. In a second position, the pistons open the passages such as the passages 22a and 22b to the passage of fluid. This occurs when the portion 46b of reduced diameter in the captive nut 46 opens the associated passage. The open position is shown in FIG. 4.

Figure 7:
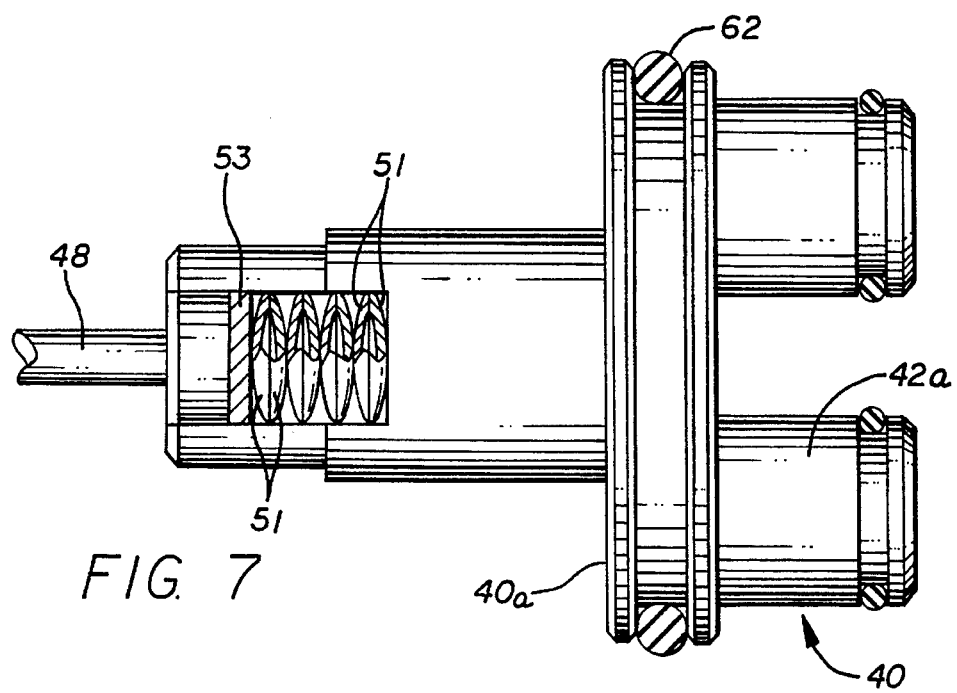
FIG. 7 is an enlarged fragmentary elevational view of one of the pistons in the apparatus.

Bushings such as a bushing 50 (FIG. 2) envelope the valve pins such as the valve pin 48. The bushings such as the bushing 50 limit the movement of pairs of valve pins such as the valve pin 48 to an in-line relationship. The bushings such as the bushing 50 may be made from a suitable material such as a carbide. Shims such as a shim 53 (FIGS. 2 and 8) are disposed on the heads of the valve pins such as the pin 48. The thickness of the shims such as the shim 53 may be varied so that the positions of the valve pins such as the valve pin 48 do not have to be adjusted. Instead of, or in addition to, the shims 53, springs such as Belleville springs 51 (FIG. 7) may be provided to adjust for the spacing between the valve pins such as the valve pin 48 and the associated pistons.

Cylinder cover plates such as cylinder cover plates 54 (FIGS. 4 and 5) are attached to the cylinder 38 as by screws 55. The cover plates such as the cover plates 54 are provided with openings to receive the pistons such as the pistons 40a and 40b. Dowels 57 are disposed between the cover plates such as the cover plate 54 and the sub manifolds 16 to prevent rotation of the cover plate relative to the sub manifold.

Figure 6:
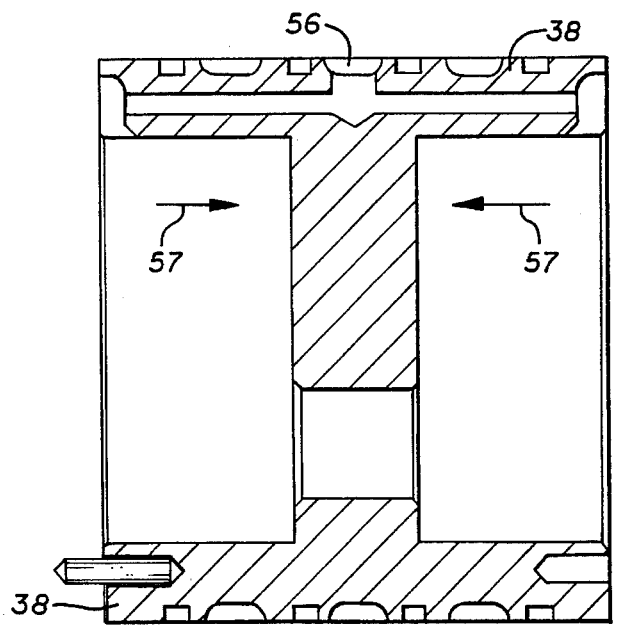
FIG. 6 is a side elevational view and shows the back-to-back in-line pistons and channels for receiving the fluid such as air under pressure to open the gates.

As will be seen, the pistons such as the pistons 40a and 40b are disposed in a back-to-back in-line relationship. The pistons such as the pistons 40a and 40b are simultaneously moved by a pneumatic fluid such as air under pressure to either the open or closed relationships. The flow of the fluid (e.g. pressurized air) under pressure to move the pistons such as the pistons 40a and 40b is provided through channels for passing the air under pressure. For example, air channels such as an air channel 56 (FIG. 6) are provided to move the pistons such as the pistons 40a and 40b to the open relationship (FIG. 4) for the passage of the pressurized air through the passages such as the passages 22a and 22b. The movements of the pistons 40a and 40b to the open relationships are indicated by arrows 57 in FIG. 6. Air channels such as an air channel 58 (FIGS. 4 and 5) provide for the disposition of air under pressure against the piston units such as the piston units 42a to move the pistons such as the piston 40a to the closed relationship (FIG. 5). Similarly, air under pressure flows through channels such as a channel 60 to apply a pressure against the piston units such as the piston units 42b for moving the pistons such as the piston 40b to the closed relationship shown in FIG. 5.

Seals such as a seal 62 (FIGS. 2 and 7) are provided between the pistons such as the pistons 40a and 40b and the cylinder bodies such as the cylinder bodies 38. The seals such as the seals 62 may be made from a suitable material such as a reinforced high temperature plastic designated as Meldin by the Furon Corporation of Worcester, Mass. A fluorosilicone material may also be used for the seals such as the seals 62. O-rings such as O-rings 64 are disposed between the cylinder body 38 and the main manifold 15. The O-rings such as the O-rings 64 may be made from the same material as the seals 62.

An air gap 65 (FIG. 2) is provided between the mold plates 12 and each of the main manifold 15 and between the mold plates 12 and the sub manifolds 16 to insulate the main manifold and the sub manifolds from the mold plates. Plugs 66 extend into the sub manifolds 16 to close the sub manifolds so that the fluid will flow only through the passages such as the passages 20a and 20b in the sub manifolds. The plugs 66 are adjustably positioned in the sub manifolds 16 and are fixedly disposed as by screws 67 after such adjustment.

In like manner, plugs 68 are adjustably disposed in the main manifold 15 to close the main manifold so that the fluid will flow only through the passages such as the passages 20a and 20b in the main manifold. After such adjustment in the position of the plugs 68, screws 69 are disposed in the maintain manifold 15 to main the plugs in fixed position. The provision of the openings filled by the plugs 66 and 68 respectively in the sub manifolds 16 and the main manifold 15 facilitates the formation of the passages such as the passages 20a and 20b in the sub manifolds and the main manifold.

Figure 9:
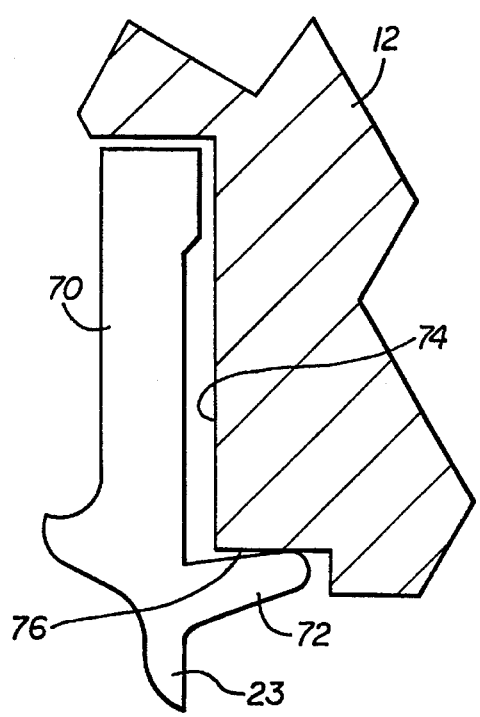
FIG. 9 illustrates an arrangement for providing a sealing between a nozzle and manifolds in the apparatus against the leakage of fluid when the manifolds are cold.
Figure 10:
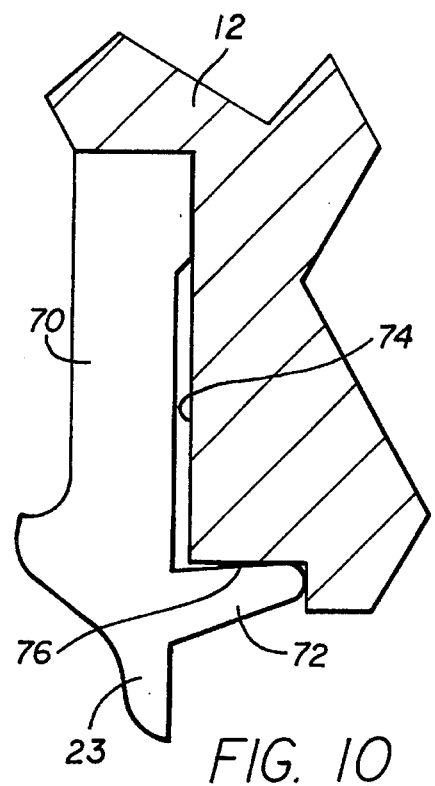
FIG. 10 is a view similar to that shown in FIG. 9 and illustrates the arrangement shown in FIG. 9 for providing the seal between the nozzle and the manifold against the leakage of fluid when the manifold has been heated by the heat from the heaters.

Arrangements are provided for preventing the fluid from leaking between the mold plates 12 and the injection nozzles such as the injection nozzle 23 when the temperature of the sub manifolds 16 changes as a result of the heat imparted to the fluid in the passages such as the passages 20a, 20b, 20c and 20d and the passages such as the passages 22a and 22b. Each of the arrangements includes a pair of tongues 70 and 72 (FIGS. 9 and 10). The tongue 70 extends into a cavity 74 in one of the mold plates 12 and has a displacement of a few thousandths of an inch from the mold plate 12 when the injection nozzle 23 and the mold plate 12 are cold. When the fluid in the gates such as the gates 22a and 22b become heated, the tongue 70 expands against the mold plate 12 and provides a seal with the mold plate.

The tongue 72 is disposed in the cavity 74 against a ledge 76 in the cavity whether the mold plate 12 and the injection nozzle 23 are hot or cold. In this way, the tongue 72 provides a seal between the mold plate 12 and the injection nozzle 23 whether the mold plate 12 and the injection nozzle 23 are hot or cold. When the fluid in the outlets such as the outlets 22a and 22b heats the injection nozzles such as the injection nozzle 23, the resultant resilient expansion in the tongues such as the tongue 72 causes the tongue to move along the ledge 76 while maintaining the tongue against the ledge. In this way, the tongues such as the tongue 76 maintain a seal between the mold plate 12 and the injection nozzles such as the nozzle 23 when the injection nozzles expand with heat.

The apparatus constituting this invention has certain important advantages. It provides for the introduction of fluid into the inlet 18, the heating of the fluid during the movement of the fluid through the passages 20a, 20b, 20c and 20d in the apparatus and the flow of the fluid simultaneously through a plurality of passages such as the passages 22a and 22b. It provides for the disposition of pairs of the passages in a back-to-back in-line relationship. It also provides for the disposition in a single cylinder body 38 of a pair of the pistons 40a and 40b controlling the movement of the fluid through the pair of passages in the back-to-back in-line relationship.

The apparatus constituting this invention further provides for the disposition and movement of the pair of pistons 40a and 40b in opposite directions in the back-to-back in-line relationship to obtain the simultaneous closure of the passages such as the passages 20a and 20b against the flow of fluid (e.g. resin melt) or the simultaneous opening of the passages to the flow of fluid. The apparatus constituting this invention further provides for the disposition of the pistons such as the pistons 40a and 40b in a compact relationship in the in-line relationship and prevents the pistons from rotating in the cylinder. This is accomplished by disposing the piston units such as the piston units 42a and 42b on the piston 40a in a diametrically disposed relationship and in a quadrature relationship to the diametrically disposed piston units 42c and 42d on the piston 40b.

The apparatus of this invention is also constructed to prevent fluid (e.g. resin melt) from leaking from the apparatus at different temperatures. This is accomplished by disposing the tongues 70 and 72 on the injection nozzle 23 and extending the tongues to the mold plate 12. The tongue 70 expands against the adjacent mold plate 12 with heat to seal the injection nozzle against the mold plate and manifold. The tongue 72 resiliently expands along the mold plate 12 with increases in temperature to maintain the seal between the injection nozzle 23 and the mold plate 12.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

I claim:

1. In combination, a housing, first means for providing a flow of fluid into the housing for a flow of the fluid through the housing, first passages communicating with the first means, pairs of second passages, each pair being in communication with an individual one of the first passages, second means for heating the fluid as the fluid flows through the passages in the housing, pistons movable in the housing, first ones of the pistons being movable in first and second opposite directions in the housing and second ones of the pistons being respectively movable in the housing in the second and first opposite directions simultaneously with the movements of the first pistons in the first and second opposite directions, third means associated with the pistons for applying a pneumatic pressure to the pistons to move the first ones of the pistons in the first and second opposite directions and to move the second ones of the pistons respectively in the second and first opposite directions simultaneously with the movements of the first ones of the pistons in the first and second opposite directions, and fourth means associated with the pistons and having first and second operative relationships with the movements of the pistons in the first and second opposite directions and operative in the first relationship to provide for the flow of the heated fluid through the first passages and the second passages in the housing and operative in the second relationship to prevent the flow of the fluid through the passages in the housing and responsive to the pressure of the pneumatic fluid from the third means for providing a change in the disposition of the pistons between the first and second relationships.

2. In a combination as set forth in claim 1, each of the first pistons being in-line with an individual one of the second pistons, the first pistons being disposed in paired units and the second pistons being disposed in paired units, each paired unit of the pistons being associated with an individual pair of the second channels, each paired unit of the first pistons being interdigitated with the in-line paired unit of the second pistons.

3. In a combination as set forth in claim 1, first heater means for heating the fluid in the first passages in the housing, and second heater means for heating the fluid in the second passages in the housing.

4. In a combination, a housing, first means for providing a flow of fluid into and through the housing, second means for heating the fluid as the fluid flows through the housing, pistons movable in the housing, first ones of the pistons being movable in a first direction in the housing and second ones of the pistons being movable in a second direction opposite to the first direction, third means associated with the pistons for applying a pneumatic pressure to the pistons to move the first ones of the pistons in the first direction and to move the second ones of the pistons in the second direction, and fourth means associated with the pistons and having first and second operative relationships with the movements of the pistons in the first and second directions and operative in the first relationship to provide for the flow of the heated fluid through the housing and operative in the second relationship to prevent the flow of the fluid from the housing and responsive to the pressure of the pneumatic fluid from the third means for providing a change in the disposition of the pistons between the first and second relationships, the housing being formed from a plurality of separable portions, fifth means for holding the separable portions of the housing in an abutting relationship, and sixth means associated with the housing for preventing the fluid from leaking between the different portions of the housing with changes in temperature resulting from the flow of the heated fluid through the housing.

5. In combination, housing means, first means disposed in the housing means for providing for the passage of fluid into the housing means, first passages in the housing means for the movement of the fluid through the housing means, each of the first passages having an in-line relationship with another of the first passages, second means disposed in the housing means for heating the fluid flowing through the first passages, second passages in the housing means for the movement of the fluid through the housing means, the second passages being paired, each pair of the second passages communicating with an individual one of the first passages, third means disposed in the housing means for heating the fluid passing through the second passages, each pair of the second passages being disposed in-line in the housing means with an individual one of the pairs of the second passages, a plurality of piston means each disposed in the housing means and each associated with an individual one of the second passages and each having first and second operative relationships and each movable to a first position for operation in the first relationship and each movable to a second position for operation in the second relationship, fourth means associated with the piston means for providing for the flow of the fluid through the associated one of the second passages in the first operative relationship of the piston means and for preventing the flow of fluid through the associated one of the second passages in the second operative relationship of the piston means, and fifth means disposed in the housing means for applying a pneumatic pressure to the piston means to obtain a controlled movement of the piston means to the first and second operative relationships, the piston means associated with each pair of the second passages being movable to the first and second positions in an opposite direction from the movement to the first and second positions of the pistons associated with the in-line pair of the second passages.

6. In a combination as set forth in claim 5, the pistons in the in-line pairs being interdigitated to minimize the space occupied by such piston means and to provide for movements of such piston means only in the direction of the in-line relationship of the second passages.

7. In a combination as set forth in claim 6, a removable cover for the piston means to facilitate the removal of the piston means from the housing if the piston means have become worn, and seventh means disposed in the housing means for heating the fluid moving through the different passages.

8. In a combination as set forth in claim 5, a separable captive nut on the piston means.

9. In a combination as set forth in claim 5, sixth means disposed in the housing means for heating the fluid moving through the different passages in the plurality.

10. In a combination as set forth in claim 5, sixth means disposed in the housing means for preventing fluid from leaking from the housing means with changes in the temperature of the fluid moving through the passages in the housing means.

11. In combination, housing means, first means disposed in the housing means for providing for the passage of fluid into the housing means, second means disposed in the housing means for defining passages for the flow of the fluid through the housing, each of the passages having an in-line relationship with another of the passages, third means disposed in the housing means for heating the fluid flowing through the housing, piston means each disposed in the housing means and each associated with an individual one of the passages and each having first and second operative relationships and each movable to a first position for operation in the first relationship and each movable to a second position for operation in the second relationship, fourth means associated with the piston means for providing for the flow of the fluid through the associated one of the passages in the first operative relationship of the piston means and for preventing the flow of fluid through the passages in the second operative relationship of the piston means, fifth means disposed in the housing means for applying a pneumatic pressure to the piston means to obtain a controlled movement of the piston means to the first and second operative relationships, and sixth means disposed in the housing means for preventing fluid from leaking from the housing means with changes in the temperature of the fluid flowing through the housing means.

12. In combination, first means disposed in abutting relationship to define a housing, second means disposed in the housing and defining a pair of first passages in a back-to back in-line relationship, third means disposed in the housing and defining pairs of additional passages, each pair of additional passages communicating with an individual one of the first pair of passages and such pair of the additional passages being in-line with another pair of the additional passages, fourth means each disposed in the housing and having first and second operative relationships for providing in the first operative relationship for a flow of fluid from the second means through an individual one of the additional passages and for preventing in a second operative relationship the flow of fluid from the second means through such individual one of the additional passages, the fourth means including pairs of pistons each disposed in the in-line relationship with the other one of the piston means in the pair and movably disposed in a back-to-back relationship to provide the operation of such fourth means in the first and second operative relationships, fifth means disposed in the housing for heating the fluid flowing through the passages, and sixth means for producing pneumatic forces on the fourth means to obtain an operation of the fourth means in the individual ones of the first and second operative relationships.

13. In a combination as set forth in claim 12, each pair of the piston means being disposed in an interdigitated relationship with the other pair of the piston means in the back-to-back in-line relationship to minimize the space occupied by the pairs of piston means in the interdigitated back-to-back in-line relationship and to provide for a movement of such interdigitated pairs of the piston means only in directions represented by the in-line relationship.

14. In a combination as set forth in claim 13, the interdigitated relationship between the pairs of piston means in the back-to-back in-line relationship being defined by a first pair of piston units extending in the in-line relationship from one of the piston means in the pair in a first diametrical disposition and by a second pair of piston units extending in the back-to-back in-line relationship from the other of the piston means in the pair in a second diametrical disposition angularly displaced from the first diametrical disposition.

15. In a combination as set forth in claim 12, a hollow body for holding the pairs of the piston means in the back-to-back in-line relationship, and the first means being disposed in separable and abutting relationship to define the housing, the pairs of piston means being disposed in the hollow body to provide for the removal of such pairs of piston means from the hollow body, when the first means becomes separated, without affecting the disposition of the other members in the combination.

16. In a combination as set forth in claim 12, seventh means disposed in the housing and responsive to changes in temperature in the housing as a result of changes in the temperature of the fluid flowing through the passages for operating upon the first means to prevent the fluid from leaking from the housing.

17. In a combination as set forth in claim 16, seventh means being disposed relative to the first means to compensate for changes in dimensions produced in the in-line direction as a result of temperature changes produced by the fluid flowing through the passages.

18. In a combination as set forth in claim 12, the fifth means including seventh means disposed in the first means for heating the fluid in the first passages, the fifth means including eighth means disposed in the first means for heating the fluid in the additional passages.

19. In a combination as set forth in claim 12, each of the piston means including a removable captive nut disposed relative to an individual one of the additional passages for providing the first and second operative relationships of such piston means.

20. In a combination as set forth in claim 13, a hollow body for holding the piston means in the pair in the in-line relationship, and a pair of seventh means each movably disposed in the hollow body on one of the piston means in the pair to facilitate the disposition of the associated piston means in the cylinder and the removal of the associated piston means from the cylinder, eighth means disposed in the housing and responsive to changes in the temperature of the fluid flowing through the passages for operating upon the first means to prevent the fluid from leaking from the housing, the fifth means including ninth means disposed in the first means for heating the fluid in the first passages, the fifth means including tenth means disposed in the first means for heating the fluid in the additional passages.

21. In a combination as set forth in claim 20, each of the piston means including a separable captive nut disposed relative to an individual one of the additional passages for providing the first and second operative relationships of such piston means, the interdigitated relationship between the pair of piston means in the back-to-back in-line relationship being defined by a first pair of piston units extending in the in-line relationship from one of the piston means in the pair in a first-diametrical disposition and by a second pair of piston units extending in the back-to-back in-line relationship from the other of the piston means in the pair in a second diametrical disposition angularly displaced from the first diametrical disposition, eleventh means disposed relative to the first means to compensate for changes in dimensions produced in the in-line direction as a result of temperature changes produced by the fluid flowing through the passages.

22. In combination, mold plate means, manifold means disposed in a pre-loaded abutting relationship against the mold plate means, first means disposed relative to the mold plate means and the manifold means for providing a path for the flow of fluid through the mold plate means and the manifold means, second means for heating the fluid passing through the manifold means, and third means disposed relative to the first means and the mold plate means and responsive to changes in the temperature of the fluid flowing through the mold plate means and the manifold means for maintaining the pre-loaded abutting relationship between the mold plate means and the manifold means.

23. In a combination as set forth in claim 22, the third means having a first portion extending in a substantially fixed relationship from the first means to the mold plate means and having a second portion resiliently extending from the first means to the mold plate means to adopt different positions against the mold plate means in accordance with changes in temperature in the fluid flowing through the mold plate means and the manifold means.

24. In a combination as set forth in claim 22, piston means disposed in the manifold means and having first and second operative relationships and operative in the first relationship to provide for the passage of the fluid through the manifold means and operative in the second relationship to prevent the passage of the fluid through the manifold means, and fourth means for exerting a pneumatic force on the piston means to obtain a controlled operation of the piston means in the first relationship at first particular times and in the second relationship at second particular times different from the first particular times.

25. In a combination as set forth in claim 22, the mold plate means having first and second sockets and the third means having a first tongue rigidly extending into the first socket and having a second tongue resiliently extending into the second socket for maintaining the pre-loaded abutting relationship between the mold plate means and the first means with changes in temperature in the fluid flowing through the mold plate means and the manifold means.

26. In a combination as set forth in claim 25, the first socket constituting an extension of the second socket.

27. In a combination as set forth in claim 25, the pair of piston means associated with each individual one of the pair of the second passages being interdigitated with the pair of the piston means associated with the pair of the second passages in-line with such individual one of the pair of the second passages to provide a compact arrangement of such pairs of piston means and to prevent rotation of such pairs of piston means during the in-line movement of such pairs of piston means.

28. In combination, mold plate means formed from a pair of portions in a separable relationship, manifold means disposed within the mold plate means and formed from separable portions, a hollow body disposed in the manifold means, a pair of piston means disposed in the hollow body in a back-to-back in-line relationship and movable in opposite directions in the in-line relationship in the hollow body, first means disposed relative to the piston means in the pair for providing a simultaneous movement of the piston means in the opposite directions between first and second positions in the in-line relationship, second means for providing for a flow of fluid into the manifold means, third means for defining passages for the flow of fluid through the manifold means, fourth means for heating the fluid flowing through the passages in the manifold means, fifth means for exerting a pneumatic force on the piston means in the pair to obtain a movement of the piston means simultaneously in the opposite directions in the in-line relationship to first and second positions to open the passages simultaneously for the flow of fluid through the passages in the first position of the piston means and to block the passages simultaneously in the second position against the flow of fluid, and sixth means for preventing the piston means in the in-line relationship from rotating relative to one another during such movement of the piston means in the in-line relationship.

29. In a combination as set forth in claim 28, the piston means in the pair being constructed to overlap each other in the in-line direction to provide a compact relationship of the piston means in the in-line direction and to provide for a movement of the piston means substantially only in the in-line relationship.

30. In a combination as set forth in claim 28, a pair of captive means each disposed on one of the piston means and each being separable from the associated one of the piston means to facilitate the removal of such piston means from the associated hollow body in the manifold means and the insertion of such piston means in the associated hollow body in the manifold means.

31. In a combination as recited in claim 28, the manifold means being disposed in a preloaded relationship with the mold plate means, seventh means for preventing fluid from leaking from the mold plate means with changes in temperature in the fluid flowing through the passages in the manifold means.

32. In a combination as set forth in claim 31, the piston means in the pair being constructed to overlap each other in the in-line direction to provide a compact relationship of the piston means in the in-line direction and to provide for a movement of the piston means substantially only in the in-line direction.

33. In a combination as set forth in claim 31, the piston means in the pair being constructed to overlap each other in the in-line direction to provide a compact relationship of the piston means in the in-line direction and to provide for a movement of the piston means substantially only in the in-line relationship.

34. In a combination as set forth in claim 33, the overlapping relationship between the piston mean sin the pair being provided by a first pair of piston units extending in the in-line relationship from one of the piston means and a second pair of piston units extending in the in-line relationship from the other of the piston units in an interdigitated relationship with the first pair of piston units.

35. In a combination as set forth in claim 28, the sixth means including a pair of tongues, one rigid and the other resilient, extending from the manifold means to the mold plate means to prevent fluid from leaking from the mold plate means with changes in temperature in the fluid flowing through the passages in the manifold means.

36. In combination, manifold means, first means disposed in the manifold means for providing an inlet for fluids, second means disposed in the manifold means for dividing the fluid from the first means into pairs of first passages, each pair of the first passages having a back-to-back in-line relationship, third means disposed in the manifold means for dividing the fluid in each of the first passages for the flow of the fluid through a pair of second passages, each of the second passages in communication with one of the first passages in a pair being back-to-back and in-line with one of the second passages in communication with the other one of the first passages in the pair, a plurality of hollow bodies each associated with an individual pair of the back-to-back in-line second passages, piston means disposed in pairs, the piston means in each pair being disposed in an individual one of the hollow bodies in a back-to-back in-line relationship with the piston means in another pair and being movable in opposite in-line directions in the hollow bodies between first and second positions in a back-to-back relationship with respect to the piston means in the other pair to provide for a flow of fluid through the passages in the first positions and to prevent the flow of fluid through the passages in the second positions, fourth means for applying a pneumatic pressure against the piston means in each pair to move the piston means between the first and second positions in the back-to-back in-line relationship, and fifth means for heating the fluid during the flow of fluid through the passages, and a plurality of nozzles disposed in pairs, each nozzle in each pair being associated with an individual one of the second passages for receiving the fluid flowing through the individual one of the second passages.

37. In a combination as set forth in claim 36, the fifth means including sixth means for heating the fluid during the flow of the fluid through the first passages and including seventh means for heating the fluid during the flow of fluid through the second passages.

38. In a combination as set forth in claim 36, sixth means associated with the piston means for providing for a movement of the piston means in substantially only the in-line direction.

39. In a combination as set forth in claim 36, sixth means for preventing fluid from leaking from the manifold means as a result of changes in the temperature of the manifold means from the heating of the fluid in the passages in the manifold means.

40. In a combination as set forth in claim 36, sixth means for preventing the piston means in the in-line relationship from rotating relative to one another during such movement of the piston means in the in-line relationship.

41. In a combination as set forth in claim 36, the fifth means including sixth means for heating the fluid in the first passages and including seventh means for heating the fluid in the second passages.

42. In a combination as set forth in claim 41, sixth means disposed relative to each nozzle and the manifold means for maintaining a sealed relationship between the manifold means and such nozzle at a pair of spaced positions on the nozzle.

43. In a combination as set forth in claim 41, a first tongue disposed on the nozzle and normally spaced from the manifold means and expansible into engagement with the manifold means with increases in the temperature of the fluid flowing through the passages in the manifold means and a second tongue disposed on the nozzle and engaging the manifold means and slidable along the manifold means with increases in the temperature of the fluid flowing through the passages in the manifold means.

44. In combination, housing means, first means disposed in the housing means for providing for the passage of fluid into the housing means, second means disposed in the housing means for defining passages for the flow of the fluid through the housing means, each of the passages in the housing means having an in-line relationship with another of the passages in the housing means, third means disposed in the housing means for heating the fluid flowing through the passages in the housing means, piston means each disposed in the housing means and each associated with an individual one of the passages in the housing means and each having first and second operative relationships and each movable to a first position for operation in the first relationship and each movable to a second position for operation in the second relationship, fourth means associated with the piston means for providing for the flow of the fluid through the associated one of the passages in the first operative relationship of the piston means and for preventing the flow of fluid through the passages in the second operative relationship of the piston means, and fifth means disposed in the housing means for applying a pneumatic pressure to the piston means to obtain a controlled movement of the piston means to the positions of the first and second operative relationships, the housing means including a pair of separable mold plates, each of the piston means including a piston, each of the pistons being individually removable from the housing means, when the mold plates are separated, without affecting the positioning of the other elements in the combination.

45. In a combination as set forth in claim 44, the piston means being disposed in an in-line relationship in communication with the passages and being disposed relative to one another to prevent the piston means from rotating.

46. In a combination as set forth in claim 44, sixth means associated with the housing means for preventing the fluid from leaking between the different parts of the housing means with changes in temperature resulting from the flow of the heated fluid through the passages in the housing means.

47. In a combination as set forth in claim 44, each of the piston means including valve means having first and second operative relationships respectively corresponding to the first and second operative relationships of such piston means, each of the valve means being associated with an individual one of the passages and being operative in the first relationship to open the individual one of the passages to the movement of the fluid through the passages in the housing means and being operative in the second relationship to close the individual one of the passages against the movement of fluid through the housing means, each of the piston means including the valve means being individually removable from the housing means, when the mold plates are separated, without affecting the other elements in the combination.

48. In a combination as set forth in claim 44, each of the piston means being disposed in a hollow body and being individually removable from the hollow body when the mold plates are separated, the hollow body having larger dimensions than the piston means in the hollow body to facilitate the removal of the piston means from the cylinder body.

49. In a combination as set forth in claim 47, each of the piston means and the associated valve means being disposed in a hollow body and being individually removable from the hollow body, when the mold plates are separated, without affecting the other elements in the combination, the hollow body having larger dimensions than the piston means in the hollow body to facilitate the removal of the piston means from the hollow body without affecting the other elements in the combination, the piston means being disposed in an in-line relationship in communication with the passages to prevent the piston means from rotating.

50. In combination for use with mold cavities to pass fluid into the mold cavities, a pair of mold plates disposed in a separable and abutting relationship, manifold means disposed in a pre-loaded abutting relationship against the mold plates, inlets extending through the mold plates into the manifold means for passing the fluid into the manifold means, first means disposed in the manifold means for providing passages for the flow of the fluid from the inlets through the manifold means, nozzles for passing the fluid from the passages into the mold cavities, piston means disposed in the manifold means and having first and second operative relationships and operative in the first relationship to provide for the flow of the fluid through the passages into the nozzles and operative in the second relationship to prevent the flow of the fluid through the passages into the nozzles, second means for heating the fluid flowing through the passages, and third means disposed relative to the nozzles and the mold plates for preventing fluid from leaking from the nozzles through the mold plates with changes in the temperature of the fluid flowing through the passages.

51. In combination as set forth in claim 50, the piston means including a pair of pistons disposed in a back-to-back in-line relationship for movement in opposite directions to obtain corresponding ones of the first and second operative relationships.

52. In a combination as set forth in claim 51 wherein the nozzles are provided with first and second tongues and wherein the first tongues are displaced from the nozzles when cold and are expansible against the mold plates with increases in temperature and wherein the second tongues are disposed against the mold plates when cold and are expansible along and against the mold plates with increases in temperature.

53. In a combination as set forth in claim 50 wherein the third means includes fourth means operable with increases in the temperature of the fluid flowing through the nozzles for providing seals between each of the nozzles and an individual one of the mold plates at a pair of spaced positions on such nozzle.

54. In a combination as set forth in claim 50, fourth means associated with the piston means for providing for the disposition of pairs of the piston means in a back-to-back in-line relationship and for providing for the movement of such pistons in opposite in-line directions to corresponding ones of the first and second relationships and for preventing such piston means from rotating during such in-line movements.

55. In combination, mold plate means formed from a pair of portions in a separable relationship, manifold means disposed within the mold plate means and formed from separable portions, a hollow body disposed in the manifold means, a pair of piston means disposed in the hollow body in a back-to-back in-line relationship and movable in opposite directions in the in-line relationship in the hollow body, first means disposed relative to the piston means in the pair for providing a simultaneous movement of the piston means in the opposite directions between first and second positions in the in-line relationship, second means for providing for a flow of fluid into the manifold means, third means for heating the fluid in the manifold means, fourth means for defining passages for the flow of fluid through the manifold means, and fifth means for exerting a pneumatic force on the piston means in the pair to obtain a movement of the piston means simultaneously in the opposite directions in the in-line relationship to first and second positions to open the passages simultaneously for the flow of fluid through the passages in the first positions of the piston means and to block the passages simultaneously in the second positions against the flow of fluid, the piston means being disposed in the hollow body to be removable from the hollow cylinder body, without affecting any of the other elements in the combination, when the pair of portions in the mold plate means are separated from each other.

56. In a combination as set forth in claim 55, captive means disposed on the piston means to provide for a separation of the piston means from the captive means and the removal of the separated piston means from the hollow cylinder body, without affecting any of the other elements in the combination, when the pair of portions in the mold plate means are separated from each other.

57. In a combination as set forth in claim 55, means for preventing fluid from leaking from the mold plate means with changes in temperature of the fluid flowing through the passages in the manifold means.

* * * * *